Aug. 3, 1954          C. J. CRANE          2,685,226

AIRCRAFT FLIGHT CONTROL OPTICAL INDICATING DEVICE

Filed July 10, 1950          5 Sheets-Sheet 1

INVENTOR.

CARL J. CRANE

BY

ATTORNEYS.

INVENTOR.
CARL J. CRANE
BY
ATTORNEYS.

Aug. 3, 1954          C. J. CRANE          2,685,226

AIRCRAFT FLIGHT CONTROL OPTICAL INDICATING DEVICE

Filed July 10, 1950          5 Sheets-Sheet 3

INVENTOR.
CARL J. CRANE
BY
ATTORNEYS.

Aug. 3, 1954         C. J. CRANE         2,685,226
AIRCRAFT FLIGHT CONTROL OPTICAL INDICATING DEVICE
Filed July 10, 1950                            5 Sheets-Sheet 4

INVENTOR.
CARL J. CRANE
BY
ATTORNEYS.

Aug. 3, 1954 C. J. CRANE 2,685,226
AIRCRAFT FLIGHT CONTROL OPTICAL INDICATING DEVICE
Filed July 10, 1950 5 Sheets-Sheet 5

INVENTOR.
CARL J. CRANE
BY
ATTORNEYS.

Patented Aug. 3, 1954

2,685,226

UNITED STATES PATENT OFFICE 2,685,226

AIRCRAFT FLIGHT CONTROL OPTICAL INDICATING DEVICE

Carl J. Crane, Sacramento, Calif.

Application July 10, 1950, Serial No. 172,831

7 Claims. (Cl. 88—24)

This invention relates generally to a unitary device for visual reference by the pilot in the control of an aircraft under blind flight conditions. Generally it relates to a device of this kind in which are embodied the indicating elements required to enable the pilot to control the aircraft in relation to terrestrial objects as well as radiated electronic space patterns simultaneously and efficiently.

It is well known that aircraft are maneuvered under conditions of blind flight with respect to airborne instruments which indicate an artificial terrestrial horizon, an azimuth reference and indicating speed devices.

So far as is known no device has been made available by which the pilot of an aircraft can roll or pitch or turn the aircraft with visual reference to indicia responsive to electronic patterns which present a similar visual reference to that provided in artificial means commonly known as artificial horizons, directional gyros and the like. Neither is it known that there exists in the art a unitary indicating means which presents both an artificial terrestrial and an artificial electronic horizon each substantially indicated parallel to each other by which the craft can be maneuvered in order to satisfy spatial orientation as well as space pattern electronic orientation in a manner conventionally understandable to the pilot, who viewing the unitary indicator can take advantage of trained reflexes to safely and accurately control his craft.

In the type of flight instruments using an electron beam traced upon a fluorescent screen of a cathode ray tube there is no unitary indicating reference which approximates the normal natural visual flight stimulus viewed in clear weather, and neither do such instruments provide like artificial indicia by which visual reference thereto can reconstruct on the part of the pilot an electronically radiated space pattern, both horizontal and vertical.

Various attempts have been made in the past to accomplish the result of controlling an aircraft with respect to the earth and to electronically radiated space patterns. These attempts have resulted in separated reference indicia having no visual resemblance to objective reality nor indeed if combined into a unitary indicator did the resultant present a visual reference to which the pilot could react in a normal manner with the speed required for safe and accurate flight control in the normal clear weather manner in which he was trained to fly.

The present invention therefore provides a unitary indicator natural in its presentation by which the experienced and inexperienced pilot may control his craft with respect to terrestrial and electronic planes of references. It not only provides in a unitary indicator information of bank, pitch, turn, heading deviation from electronic glide path, deviation from vertical electronic course path and rates of approach thereto, and rates of departure therefrom, but, presents this information in a normal highly interpretable and natural manner.

It is therefore a primary object of this invention to provide novel instrumental means to accomplish craft control in relation to electronic and terrestrial reference data.

Another object is to present the instrumental data for visual reference in a unitary and natural manner.

Another object is to provide instrumental means for "selecting out" or "selecting in" those visual reference indicia instantly desired by the pilot.

Another object of this invention is to provide a means of approach to an electronically radiated space pattern for control of the aircraft in a manner which will prevent or reduce the hunting or over-controlling of the craft in the space adjustment of its flight path to that of the electronically radiated path.

A further object of this invention is the combination use of the artificial horizon established by a gyroscope having a vertical spin axis, and the presentation of the "card" of a compass, gyro-controlled compass, or directional gyro, to portray a unitary replica of the "natural" instrument, seen in its visual mainfestations of turning, banking, climbing and gliding.

Another object of the invention is the simple means of optically selecting various elements or indicia to be included in the unitary portrayal of needed indicia depending on the particular flight problem confronting the pilot.

Still another object of the invention is the means for optically associating turn rate and heading of the aircraft with the bank angle of the aircraft to provide the all-important concept of coordination of control with "feel" thereby giving the pilot a freedom from "vertigo" and "leans."

Another feature of the unitary instrumental presentation of indicia responsive to electronic glide path and course path is the manner of portraying the banking and pitching attitude of the aircraft index with respect to these two paths.

Another improved feature of the device is the manner in which the portrayed electronic horizon may be used alone as a reference for flight spatial and electronic spatial reference and then used in conjunction with the artificial terrestrial horizon to justify the flight path of the airplane along a glide beam, with the pitch attitude of the aircraft.

Another novel feature of the arrangement of combined indicia is the presentation in the same field of view, and in the same plane of reference the numerical value of landing air speed and a sky pattern.

Another feature of the portrayal of related and combined indicia into a unitary indicator for flight control and electronic navigation control is the pleasant normal natural indicating face in which the cloud pattern and horizon can appear slightly beyond the airplane index as is normal to clear-weather flight relieving the pilot of eye strain common to cathode ray type of reference indicators which need frequent adjustment for brilliance control and flicker control.

A further object of this invention is the provision of an improved arrangement of aircraft instruments which have been modified so as to adapt themselves in an improved optical system wherein by simple reflection means the functional visual stimuli designated in naturally viewed clear weather manner portrays the flight attitude and rate changes of the aircraft.

Other objects and advantages of this invention will be apparent during the course of the following detailed description.

In the accompanying drawings, forming a part of this specification, and wherein similar reference characters designate corresponding parts throughout the several views.

In the drawings, wherein for the purpose of illustration is shown only a preferred embodiment of the invention, the letter A may generally designate the flight instrument. It includes a casing structure B having associated therewith an altimeter C; air speed indicator D; rate of climb instrument E; directional gyro F; gyro-horizon G and an electronic space instrument H. Optical means K is provided to optically blend or merge the various indicia from these instruments at the reference plane or locus of the indicating face of the electronic space instrument "H" viewed through an eye piece L. Improved illuminating means M is provided, and a shield mechanism N is associated within the instrument to perfect the display of the various indicia of the instruments, as will be subsequently mentioned.

The casing structure B preferably includes a base 20 having a panel 21 upon which the eye piece L is positioned. The casing structure furthermore includes a top wall 22, side walls 23 and 24 and a rear wall 25. The walls 22—25 may be of metal, plastic or other material. Preferably they are integral and detachably connected to the base and the front panel, as shown.

The eye piece or viewing tube L has a tapered passageway therethrough and it is directed so as to permit viewing therethrough a blended assemblage of various instrument indicia, both direct and as reflected by means of an optical system.

Figure 4:
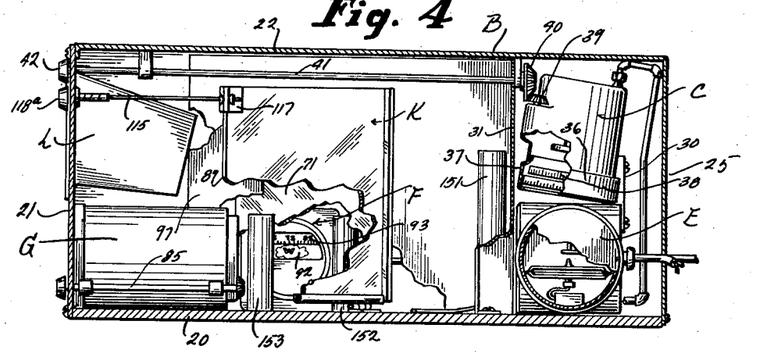
Figures 4 and 5 are vertical cross sectional views taken through the instrument substantially on the respective lines 4—4 and 5—5 shown in Figure 3.

In the compartment of the casing is located an altimeter C; air speed instrument D; rate of climb instrument E and the electronic space instrument H. The air speed and rate of climb instruments are respectively supported on the base 20 by means of brackets 27 and 28. The electronic space instrument H is directly secured to the base 20, and a bracket 30 secured therewith, as shown in Figure 4, mounts the altimeter C in position.

Figure 3:
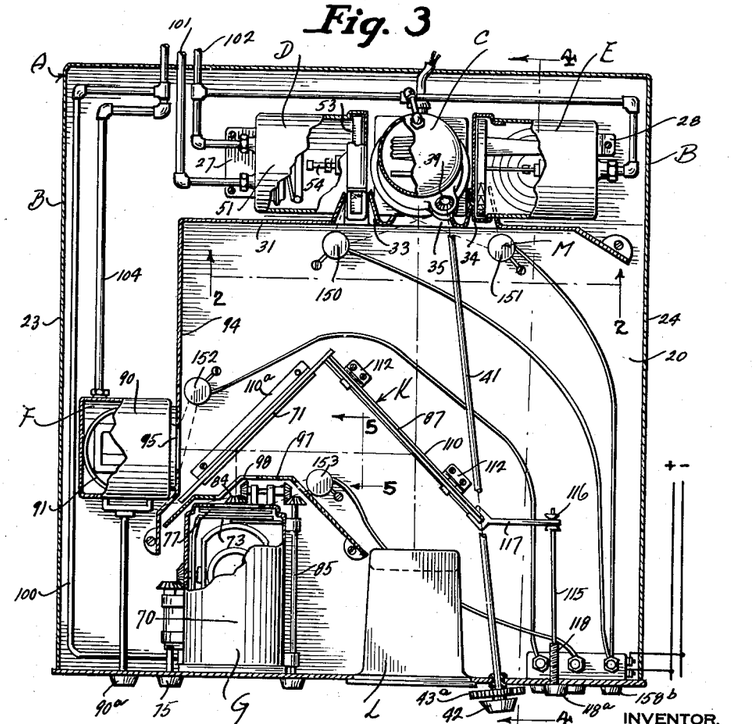
Figure 3 is a fragmentary plan showing certain instruments of the improved craft indicating system.
Figure 8:
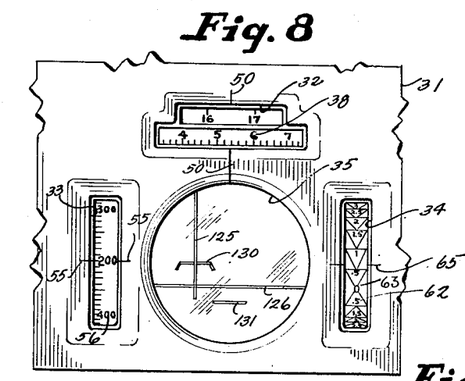
Figure 8 is a view taken in front of the shield which blocks the instrument shown in Figure 2, and showing the indicia visible through the openings in that shield.

Forming part of the shield assemblage N is a shield panel 31, shown in Figure 3, located forwardly of the instruments C, D, E, and H, which is provided with openings 32, 33, 34 and 35 therein for the respective instruments C, D, E and H, as shown in Figure 8. These instruments are located in such relation that the markings thereof are clearly visible to an observer looking through the eye piece L.

Figure 2:
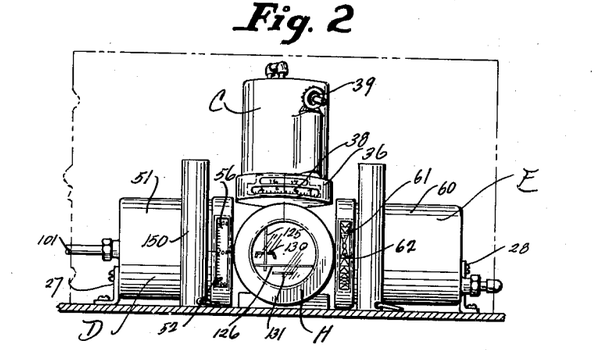
Figure 2 is a fragmentary front elevation showing various instruments of the improved craft control device, the view being taken substantially on the line 2—2 of Figure 3, but with a shield removed.
Figure 10:
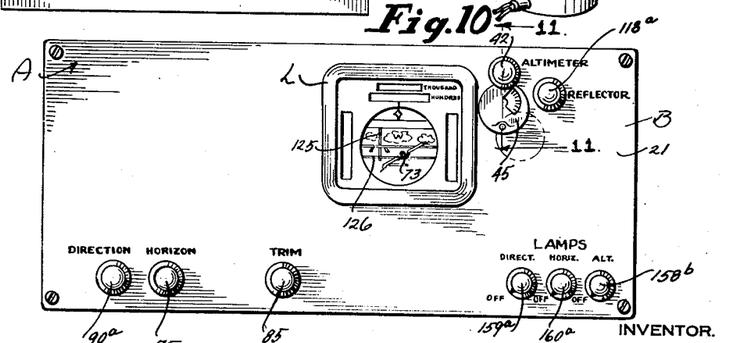
Figure 10 is a front view of the panel of the instrument.
Figure 11:
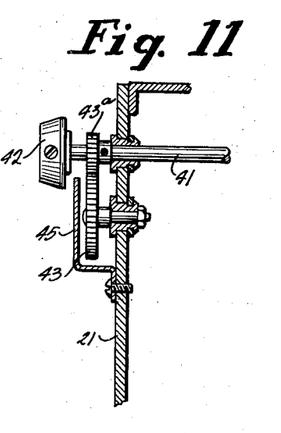
Figure 11 is an enlarged cross sectional view taken through the altimeter control resetting means, the view being taken substantially on the line 11—11 of Figure 10.

The altimeter C is somewhat different from the conventional altimeter construction in that the casing cylindrical wall 36, as shown in Figure 2, is provided with sight opening 37 through which is visible the rotatable barometric dial readings 38. The latter are located peripherally upon a dial or card which takes the place of the pressure actuated pointer of the conventional altimeter and is therefor rotatable. The instrument C is provided with the usual adjusting means to calibrate the instrument for varying atmospheric conditions. The adjusting means includes a beveled gear 39, shown in Figures 2, 3 and 4 of the drawings, which meshes with the manual adjusting control gear 40. The latter has a horizontally disposed shaft 41 extending through the panel 21 where it is provided with a manually controlled knob 42, as shown in Figure 11. The panel 21 is provided with a wheel 43 in mesh with a pinion 43ª keyed upon the shaft 41, as shown in Figure 11, and a shield 45 is provided, having a window opening to see the readings on the wheel 43, as shown in Figure 10. The shield 31 may be provided with a white index marking 50 thereon in complementary relation to the altimeter readings 38 of the dial, as shown in Figure 8.

The air speed indicator D is mainly conventional in construction including a casing 51 of cylindrical formation having a window opening 52 in the periphery of the casing, as shown in Figure 2. In place of the pointer of the conventional air speed instrument moving over a stationary dial or card, the card 53 of the present instrument is connected to the conventional pointer shaft 54, and the flanged periphery of the card 53 is provided with the air speed markings 56 thereon, as shown in Figure 2. The shield 31 is provided with fixed white indicating marks 55 to facilitate reading of the dial air speed marks 56.

The rate of climb instrument E, is similar to that of the air speed indicator D, has a casing structure 60 provided with a segmental peripheral opening 61 in the cylindrical end thereof through which are readable the markings 62 upon a peripheral flange of movable dial or card 63. The dial is keyed to the pointer shaft of the conventional instrument. The readings 62 are visible through the shield opening 34 of Figure 8, and said shield has white reference markings 65 for determining the proper reading.

Figure 7:
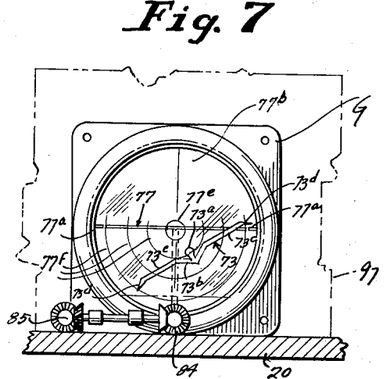
Figure 7 is an elevational view of the gyro-horizon looking at the index end thereof showing the casing base in cross section and the screen in dot and dash lines.

The artificial horizon G is basically of the Sperry type, but modified as hereinafter mentioned. In includes a casing structure 70 mounted upon the front panel base of the instrument A. The visible opening of the gyro horizon does not face the pilot, but faces the direction of flight. In place of the conventional movable horizon bar the instrument G is provided with an airplane index 73, shown in Figure 7 of the drawings and elsewhere. The index 73 has a nose simulation portion 73ª located within a V-shaped central portion 73ᵇ. The ends of the latter have aligning wings 73ᶜ and angled tip 73ᵈ, the outer surfaces of which are at an angle of 45° to the wings 73ᶜ. In a 30° left bank the left wing root of the V portion 73ᵇ will be parallel to the horizontal as shown in the drawings; in a 45° left bank the left wing tip 73ᵈ would be perpendicular to the horizon, and in a 60° left bank the right wing root of the V portion 73ᵇ would be perpendicular to the horizon. The index 73 functions the same as the horizon bar of the conventional gyro-horizon instrument. A conventional caging adjustment is provided of the knob and gearing type shown at 75 of Figure 3. The gyro-horizon instrument G has a white colored horizontal bar 77, and means for manually raising and lowering it. In the conventional gyro-horizon the airplane index is manually moved upward or downward by means of a trim mechanism, whereas in the present invention the white horizontal bar 77 is so raised and lowered. In the conventional instrument the horizontal bar is operated by the gyroscopic mechanism, but in the present instrument the airplane index shown at 73 is so operated. The horizon 77 is the terrestrial horizon and the index 73 is the bank and climb index, as will be subsequently mentioned.

Figure 14:
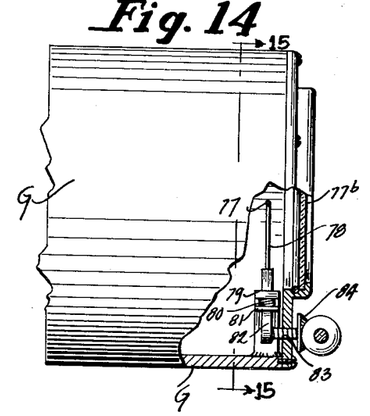
Figure 14 is a fragmentary view, partly in section, showing a horizon turn knob arrangement for raising and lowering a horizon bar of the gyro horizon instrument.
Figure 15:
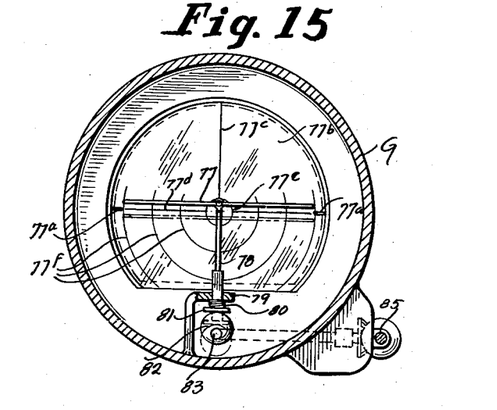
Figure 15 is a cross sectional view taken substantially on the line 15—15 of Figure 14.
Figure 16:
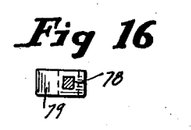
Figure 16 is a cross sectional view taken substantially on the line 16—16 of Figure 14.

Referring to Figures 3, 14 and 15, the white horizontal bar 77 is mounted upon the upper end of a vertically disposed shaft 78 sliding in a bearing 79. The shaft is spring loaded at 80 to normally force the flanged end 81 of the shaft against a cam 82. The latter is rotatably mounted upon a shaft 83. The latter has a gear 84 in mesh with a gearing and trim knob control assemblage indicated at 85 leading to the face of panel 21. The terrestrial horizon reference marks 77ª are etched on the cover glass 77ᵇ of instrument, as are also a vertical line 77ᶜ, a horizontal line 77ᵈ, a center circle 77ᵉ, and concentric arcs 77ᶠ.

Referring to the direction gyro F, the same includes a casing 90 with its axis normal to the axis of the instrument G. It is supported upon the frame of the casing B, adjacent to the side wall 23.

Figure 13:
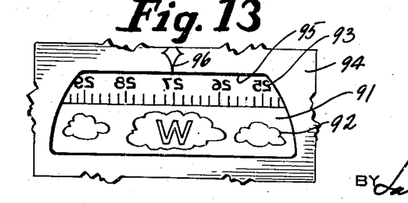
Figure 13 is a direct front view of improved display indicia for the directional gyro.

The directional gyro F is substantially equivalent to the conventional "Sperry" directional gyro except that its card 91, as indicated in Figure 13 of the drawings, is provided with a cloud pattern 92 and degree indicia. The latter are reversed, since they will be reflected from an optical mirror, as will be subsequently described. This instrument may be replaced by other directional indicating devices, such as the repeater card of well known and conventional gyrosyn or fluxgate compass repeaters, if so desired.

The cloud pattern can be tinted in contrasting colors. For instance clouds in the North quadrant can be tinted white; in the East blue; in the South amber and in the West red. This will associate cardinal directions with the cloud line.

Figure 5:
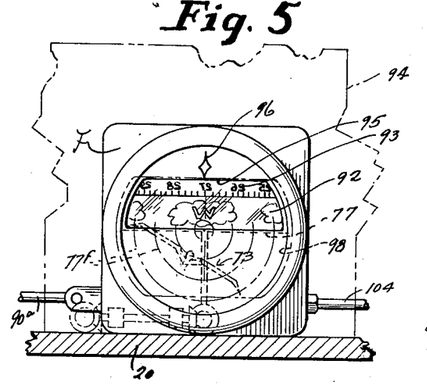

As part of the shielding assemblage N, a second shield 94 is provided, as shown in Figures 3 and 13 of the drawings. It has an opening 95 therein through which are visible the cloud pattern 92 and the indicia 93, with reference to a white indicator mark 96, which may be located upon the shield 94. The dot and dash lines in Figure 5 show the opening in this shield.

A third shield 97 is shown in Figure 3, within the casing B in front of the instrument G. It has an opening indicated by the dot and dash line 98 in Figures 5 and 7, thru which are visible the terrestrial horizon 77 and the airplane index 73.

The gyro horizon G and directional gyro F are provided with the usual operating suction to the cases thru the conduits 100 and 104 as shown in Figure 3. Air withdrawn from the cases is replaced with air that enters thru any suitable openings (not shown) to the cases.

The air speed meter D is provided with two tubes 101 and 102, the former leading to the pressure element at the Pitot-static tube, and the other leading to the static element of the Pitot-static tube. The static line is connected to the cases of the air speed meter, altimeter and vertical speed indicator and functions as in conventional practice.

Referring to the optical image concentrating means K, the same includes partial mirrors 71 and 87. That is, they are both transparent, partially surfaced mirrors and are disposed vertically with their faces substantially 90° to each other. The mirror 71 is fixed, but mirror 87 has adjusting means which will be subsequently described.

It is understood in the art that a partial mirror is one that has a chromium or alumium deposit on the front of the glass rather than the back. The intensity or amount of the deposit will determine the amount of light transmitted thru the mirror in relation to the amount reflected. Since the reflecting agent is on the front of the glass only, one image is reflected.

The mirror 71 faces diagonally at an angle of 45° with respect to the indicia reading of faces of instruments F and G. The mirror 87 faces the opening of tube L at angle of 45°. The mirror 87 reflects the card of the directional gyro to the observer. The airplane index and horizon of the instrument G, are viewed thru two reflections, one from the first surface of the mirror 71 and again from the first surface of the mirror 87, to the eye of the observer. These images of the two instruments F and G are thus reflected substantially as shown in Figure 5, where the dot and dash lines designate the reflection from the instrument G; the card of the instrument F being clearly visible thru the mirror 71. The broken border dot and dash lines in this view designate the shield 94.

The readings from the instruments C, D, E and H are visible thru the mirror 87, without reflection.

The mirror 71 is preferably mounted in suitable channel moulding 110a shown in Figure 3 of the drawings, upon the base 20 of the casing structure.

Figure 17:
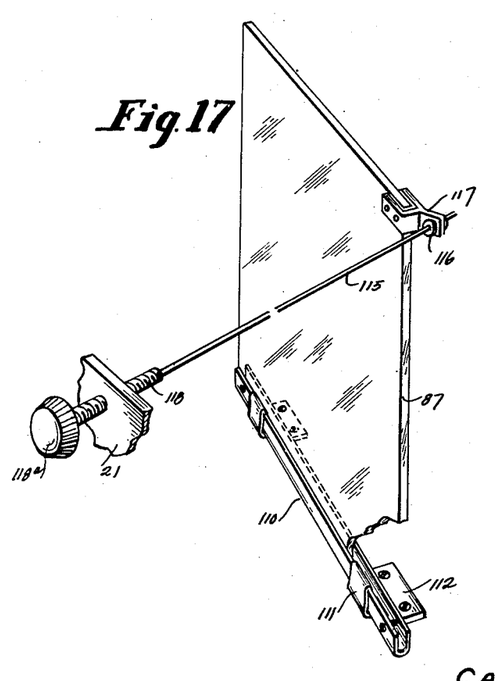
Figure 17 is a perspective view of an optical mirror associated with the instrument.
Figure 18:
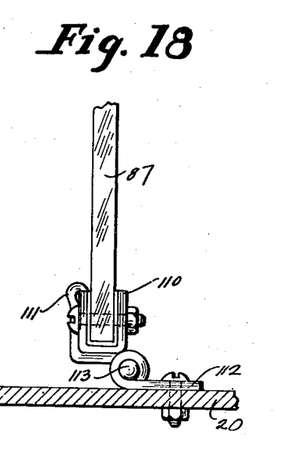
Figure 18 is a fragmentary view showing the pivot mounting of one of the optical mirrors.

The mirror 87 is mounted as shown in Figures 3, 17 and 18, in order that it can be adjusted. As shown, the mirror 87 is mounted in suitable moulding 110, channeled at the bottom margin thereof. The moulding 110 is preferably provided with suitable extensions 111, which have hinge barrels adapted to align with complementary hinge barrels of leaves 112 screwed or otherwise detachably mounted upon the base 20 of the casing structure. These hinge barrels receive pintles 113.

The means for manually controlling the position of the mirror 87 includes a stiff but flexible spring steel wire 115 rotatably bearing at 116 in a bracket 117 attached to the mirror 87. The wire 115 at the panel 21 is provided with screw threads 118 threaded in a suitable opening in the panel 21. The wire is controlled by means of a knob 119a thru feeding the wire in or out the mirror may be caused to tilt to the desired degree in order to properly transmit the image to the eye of the observer.

Referring to the illuminating means M (Figures 3 and 12) the same includes lamps 150 and 151 for casting rays of light upon the indicia of the instruments C, D, E and H; a lamp 152 for casting rays of light upon the indicia of the instrument F, and a lamp 153 to cast rays of light upon instrument G.

Figure 9:
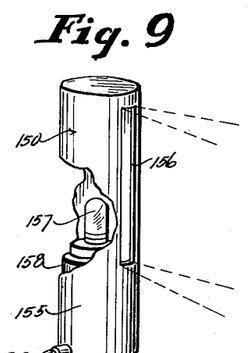
Figure 9 is a fragmentary perspective view showing an instrument lamp, several of which are employed in the device in connection with the optical system and instrument display indicia.

The type of lamp is shown in Figure 9. It includes a Plexiglas tube 155 externally of dull black color, and provided with a slot 156 therein thru which light rays are transmitted. A lamp bulb 157 is supported by the usual socket mechanism 158.

Figure 12:
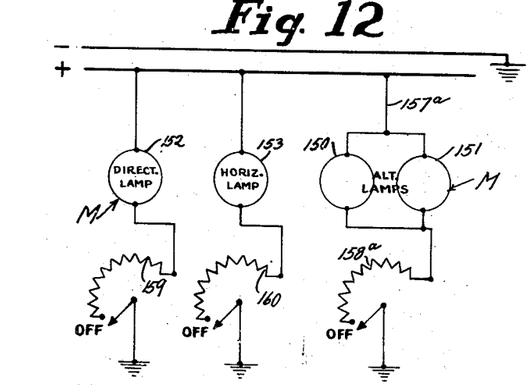
Figure 12 is a diagrammatic view showing electric illuminating means for the instrument.

As shown in Figure 12 of the drawings the lamps are connected in a circuit 157a. The lamps 150 and 151 are provided with a rheostat switch 158a for the control thereof, and the lamps 152 and 153 respectively have individual rheostat switches 159 and 160. The knobs for control of the switches 158a, 159 and 160 are shown upon the panel 21 at 158b, 159a and 160a respectively.

All of the shields 31, 94 and 97 of the shielding means N are provided with dull black surfacing, particularly the sides facing the optical arrangement, in order to expose to view only the scales and indicia, and to kill all unwanted reflections and exposed parts.

It should be noted that the density of the two partial mirrors is such that there is a pleasing balance of readability between the various images. This is also controlled by the amount of illumination which is cast upon the indices of the various instruments. The intensity of illumination will be regulated by the rheostat switches to suit night or day conditions. The distances from the eye of the observer to the various indicia of the instrument, however reflected, or illuminated, must be substantially the same in order that the superimposing of the various instrument indications will provide an absence of parallax. This principle may be departed from slightly in order to give an impression of depth when receiving the reflected images, such as may be desired in having the image of the face of the directional card, upon which the cloud pattern is portrayed, a slightly greater distance away; giving the effect of a cloud pattern line beyond the airplane index of the artificial horizon instrument. Such slightly greater distance will not result in parallax of any order that would be detrimental to the precise use of the instrument.

Figure 6:
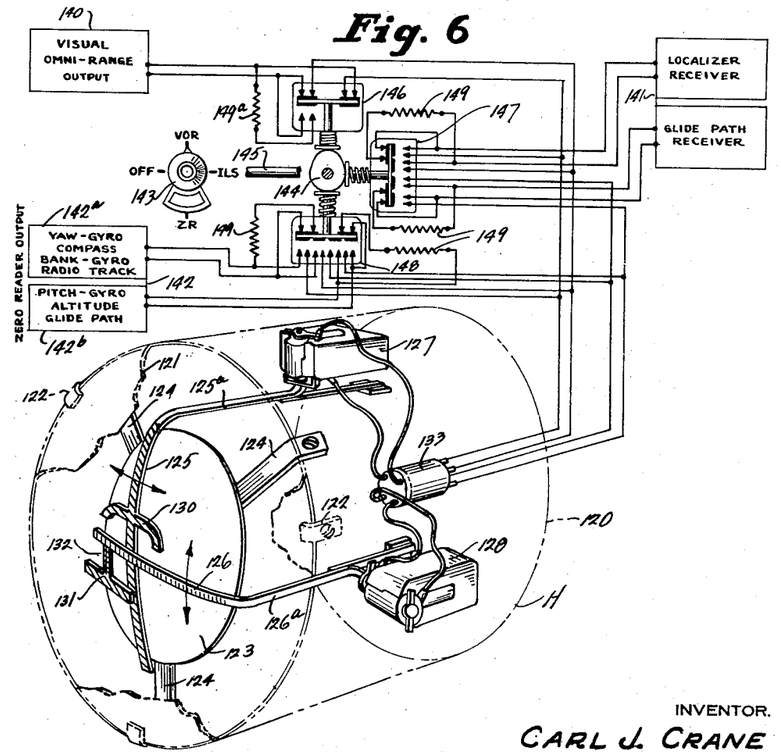
Figure 6 is a fragmentary perspective view, partly diagrammatic, showing an improved type of flight gauge known as an electronic space instrument.

Referring to the electronic space indicator H, as shown in the various views of the drawings, and in fragmentary and diagrammatic form in Figure 6 of the drawings, the instrument includes a casing structure 120 which supports a cover glass 121 at the front thereof, held in the case by means of clips 122. A shield 123, which is spherically curved and segmental in cross section, is supported by brackets 124. The convex face is colored dull black and over it operate the electronic vertical bar 125 and electronic horizontal bar 126.

The casing structure 120 supports galvanometers 127 and 128 in any approved manner. The vertical bar 125 is connected by an arm 125a to the movable coil of galvanometer 127. The bar or pointer 126 sweeps up and down and is connected by an arm 126a to the movable coil of galvanometer 128. The arrows shown in Fig. 6 at the face of the instrument designate the sweep of the bars 125 and 126.

The galvanometers 127 and 128 are essentially microammeter types, the coils thereof rotating to swing the pointers either left or right or up and down, depending on the flow direction of current. Of course the pointer 125 only swings left and right and the pointer 126 up and down. The galvanometers are actuated by means of energy received from associated radio-receiving equipment and may be the well known ILS localizer beam, the energy received from an Omni-Range receiver; the energy received from a Directional Finder Receiver, or that received from a "Sperry" Zero-Reader.

The vertical electronic actuated bar or pointer 125 is provided with laterally extending horizontal arms 130, the ends of which are downturned, and the general appearance of which is that of a silhouetted perspective view of an approaching runway head-on. Complementary thereto, the electronic horizon bar 126 is provided with a horizontal arm portion 131 supported below the bar 126 by a bracket 132. The arm 131 is intended to present the leading edge view of the runway.

The vertical bar 125 and the arm positions 130 are tinted green upon their visible faces. Likewise, the complementary segment or arm portion 131 may be tinted green. The face of the arm 126 may be tinted some contrasting color, if desired.

The horizontally disposed up and down swinging arm or pointer 126 registers movement "up" when the aircraft is below the glide beam and "down" when the aircraft is above the glide beam. The vertical arm or pointer 125 represents the movement of the plane to the right or left, of the ILS localizer beam, or the Omni-Range course, or indicates the transmitted signal outputs from the "Sperry" Zero Reader by selected switching.

When the cross pointers 125 and 126 are in the neutral or zero position for landing, the portions 130 and 131 will represent a closed figure.

The socket plug 133 receives the wire leads from the galvanometers 127 and 128 as shown. The pointers 125 and 126 are transversely curved, as indicated in Figure 6, in order that they will always remain in close proximity to each other as the pivoted pointers of the galvanometers swing, and thereby eliminating parallax, regardless of their position.

Switching means diagrammatically illustrated in Figure 6 is provided for selecting the output of the Instrument Landing System, now common VHF, installed at U. S. ports, or the output from the "Omni-Directional Range," or the output of such other devices as the "Sperry Zero Reader."

Figure 6 shows the "Omni-Range" output at 140; the ILS output at 141 and the "Sperry Zero Reader" output at 142. In Figure 6, 143 represents a pivoted switch handle which, as shown diagrammatically, is connected to a switch actuating cam 144 by means of a shaft 145. The "Omni-Range" output is provided with a switch 146; the ILS output with a switch 147; and the "Sperry Zero Reader" output with a switch 148. The single cam 144 is intended to selectively actuate the switches 146, 147 and 148, as shown. The lines leading to the electronic vertical and horizontal actuating galvanometers 127 and 128 are shown in the drawings. It is to be noted that placing the switch arm or handle 143 in position for actuating the switch 147 to the cam 144 will energize both pointers of the cross pointer instrument H, the runway localizer vertical pointer and the glide path horizontal pointer, as indicated. Actuating the "Omni-Range" switch 146 by means of the cam 144, through turning the handle 143, will actuate the vertical pointer of the instrument H by whatever current, in microamperes, is flowing from the receiver to the cross pointer galvanometer. At this time the current to the glide path (horizontal pointer) is left open, since the "Omni-Range" receiver includes no glide path receiver.

The "Sperry Zero Reader" output 142 consists of the yaw, compass, bank and radio track unit 142ª, and the pitch, altitude and glide path unit 142ᵇ, as is known to those skilled in the art. The unit 142ª actuates the galvanometer of the cross pointer instrument controlling the vertical electronic bar, and the unit 142ᵇ actuates the galvanometer of the electronic horizontal bar.

It is to be noted that the movable switch members of the switches 146, 147 and 148 are spring loaded to normally opened position. They may be of any commercially available type, and are only diagrammatically shown in Figure 6. As shown in the drawings, the springs are of the compressor types.

It is to be noted that resistors 149 are provided for each of the two units of the ILS output and Sperry Zero Reader output, and a single resistor unit 149ª for the "Omni-Range" output. In the open position for the switches, the switch contacts are electrically made to place the resistors across the circuits leading to the switches respectively from the outputs 140, 141 and 142. The high resistance resistors have the purpose of placing an electrical load on the output of the respective devices, in order that they may be left in a "hot" or stand-by condition, electrically ready for on-switching at all desired times, even though the switch handle 143 is in an "off" position.

With the switch handle 143 in an "off" position the resistor of the switch 146 is shunted across the two wire circuits leading to the said switch from the output 140; the resistors of the switch 147 are shunted respectively across the two wire circuits leading from the localizer unit of the output 141 and the two wire circuits leading from the glide path receiver portion of the output 141, and the resistors of the switch 148 are shunted, one of them across the two wire circuits leading to the switch from the unit 142ª and the two wire circuits leading to the switch from the unit 142ᵇ.

It will be apparent from the foregoing that the invention consists of a real combination of flight stimuli imparting a visual coordination or mixing of natural flight attitudes and rates. The invention does not consist of a mere projected aggregation on a screen of a plurality of instrument indicia. It is an optical combination, by a simple reflection, of functional visual stimuli, reporting simultaneously in naturally viewed clear weather manner the flight attitude and rate changes of the aircraft, with respect to terrestrial planes of reference as well as to electronic planes of reference; or to mixtures thereof.

Figure 1:
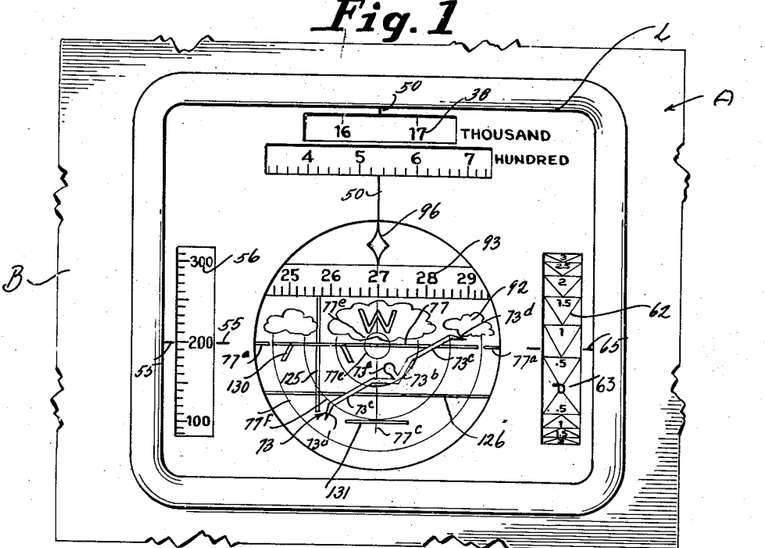
Figure 1 is a display of front elevation of the indicating face of the unitary flight control indicia consisting of all optically associated elements of the instrument.

Referring again to the gyro-horizon instrument G, the airplane index 73 remains parallel to the real horizon, and the horizon line 77 banks with the aircraft. Thus is imparted correct knowledge of the bank angle in a manner to relieve the pilot of bank vertigo. At the same time this imparts a banking reference to the artificial terrestrial horizon, as well as the artificial electronic horizon of the instrument H. In Figure 1 is shown the observer's view of the various indicia. It indicates to the pilot the aircraft is flying with the left wing down, and the degree is determined by the relation of the lines of the index 73 to the horizon and vertical lines otherwise visible. That is, if the left wing tip line assumes a position perpendicular to the horizon, a bank angle of 45° would instantly be indicated to the pilot, etc. The aircraft upon which the instrument of Figure 1 is located is in a left bank and turn, resulting in the cloud pattern of the background and its markings of azimuth moving from left to right. The speed with which this movement takes place depends upon the type and speed of the aircraft used. The pilot familiar with the type of aircraft soon learns and "feels" the proper bank angle for rate of turn when he can see the natural instrument in clear weather, and in the case of the present invention a similar result can be achieved. Should the aircraft begin to climb while in the left turn, the airplane index 73 would appear to rise above the horizon line 77 and its silhouette would then appear to be passing across the cloud pattern.

Should a diving turn to the left be started, the airplane index 73 will begin to fall, passing the horizon line 77 and then assume some position below the horizon line representative of the glide angle. It is therefore quite obvious that various combinations of bank, turn, climb and glide will present to the pilot a realistic visual stimulus of the various flight attitudes and turn rates which will be presented in the normal natural manner rather than in the split unnatural present methods of indicating flight attitudes and changes.

Referring to the pilot's view of the instruments as shown in Figure 1, it will be noted that the lubber line 96 is over the directional scale indicating 270°. The airplane index shows the aircraft to be to the right of the runway course beam as represented by the electronic vertical marker 125. The airplane index 73 indicates a gliding left turn in progress, and it lies above the glide path electronic horizontal bar 126. The latter lies below the terrestrial horizon line 77, indicating that the aircraft is above and to the right of the flight line which will bring the aircraft to a landing on the runway, for example, whose axis lies 270°.

As the left turn progresses, the desired object would be, first, to have the nose of the airplane index intersect the electronic vertical 125 at the vertical lubber line. This then would insure that the aircraft was on the runway course beam and as this obtains, the pilot noting the direction indicator, will then turn the aircraft to the right to recover a heading of 270°, insuring that the aircraft is headed down the runway axis. This condition can be met and held only in the absence of a cross wind component.

Should a cross wind be present, say from the South, some heading less than 270° will be sought. This would permit the electronic vertical 125 to pass through the nose of the airplane index 73. This procedure of adjustment, using the present invention is quite as easy as would be obtained in an approach to the runway in clear weather.

By visual flight reference, simultaneously viewing of all necessary factors, namely direction, rate of change of direction, displacement from runway course beam, and rate of closure thereto are seen and evaluated in a manner substantially identical with the normal natural instrument.

After reaching a steady runway course, to be held for the approach, the glide beam is approached, either by reducing the speed, maintaining attitude of level flight, and accepting a rate of descent until the electronic horizon 126 rises and intersects the terrestrial horizon 77 in every case, at which moment the aircraft is on the proper glide path.

Another method of reaching the desired glide path is to change the pitch attitude of the airplane index 73, placing the nose on or in the direction of the glide path electronic horizon, applying or reducing engine power to maintain desired air speed, and as the electronic horizon 126 returns coincident with the terrestrial horizon 77, the pitch angle changes producing a "follow-up" method of pitch control of the aircraft to produce the important accurate maintenance of path justification with the glide path to the runway for landing of the aircraft.

In the approach landing just described, no other instrument need be referred to at any time other than the pilot's view through the viewing tube, since all necessary elements are contained in the presentation of indices shown in Figure 1.

Obviously if a landing is not being made, and if the cross pointer electronic vertical or electronic horizon are not needed for navigational purposes, such as would be true in flying a VHF radio range, or the "Omni-Directional" ranges, the light switch controlling current which illuminates the cross pointer indicator may be opened, thereby eliminating the pattern from view. Any of the other scale or index presentations may be eliminated or selected at will. For instance, in clear weather the only desired presentation may be the cross pointer pattern in order to use the electronic vertical in conjunction with the "Omni-Directional" range, or other electronic navigation systems which use a left-right sensing galvanometer.

Various changes in the rearrangement of the various units of the instrument may be made within the casing structure without departing from the spirit of the invention or the scope of the claims.

I claim:

1. In a craft controlling device the combination of a supporting frame, a gyro horizon having an index in the form of an airplane mounted to move in designation of bank, climb and dive and having a terrestrial horizon index disposed to parallel the transverse axis of the air craft to which the instrument is attached, a directional gyro having an index simulating a cloud pattern and turn degree indications sensed functionally, an electronic space indicator having complementary vertical electronic and horizontal electronic indices with radio receiving energy actuated means for movement of said vertical and horizontal indices in designation of plane movement to the right or left and up and down with respect to the localizer beam and glide beam, and reflecting an optical means blending said gyro controlled indicia and the vertical and horizontal indicia of electronic space indicators together in normally sensed complementary relation at a common locus in realistic visual stimulus of the various flight attitudes, turn quantities and path changes of the air craft to which attached whereby to facilitate the pilot's utilization of normal sense impressions.

2. A flight instrument as described in claim 1 wherein the vertical index of the electronic space indicator is provided with an inverted substantially U-shaped index movable with the vertical index and including a horizontal portion and appended outwardly angled portions in complementary position to cooperate with the horizontal index of the electronic space indicator in flight designation for runway landing.

3. In a craft controlling device the combination of a supporting frame, a gyro horizon having an index in the form of an airplane with a wing and mounted to move in designation of bank, climb and dive and having a terrestrial horizon index located to parallel the transverse axis of the aircraft to which the instrument is attached, said airplane index being provided with a centrally located V-shaped body portion and the extreme wing ends being down-turned in divergent relation, a directional gyro having an index simulating a cloud pattern and turn degree indications correctly sensed, and reflecting and optical means associated with the indicia of said gyro horizon and directional gyro blending all of the indicia thereof together at a common locus in realistic visual stimulus of the various attitudes and turn quantities and path changes of the aircraft to facilitate the pilot's coordination of normal sense impressions.

4. A flight designating instrument for aircraft comprising an index, gyroscopic means for operating said index in designation of turn of an aircraft with movements sensed in accordance with a normal clear weather turning view as seen by a pilot from the aircraft, a second index, gyroscopic means for operating the second index in designation of bank and pitch with sensing and degrees of bank and pitch movements corresponding to those of an aircraft in flight, electronically responsive horizontal and vertical indices, electrical means for operating said electronically responsive indices with locating movements corresponding to the position of the aircraft with respect to radiated space patterns definitive of runway location and orientation, and means for integrating all of said indices and their related movements at a common locus for stimulation of pilot responses in accordance with normal conditioned reflexes.

5. A flight instrument for aircraft as set forth in claim 4 wherein the means for integrating all of said indices comprises an optical system, and intensity adjustable illuminating means for the indices.

6. An aircraft instrument for indicating to the pilot a complete visual stimulus of the movements of the aircraft about its axes and the displacement of the aircraft from space radiated electronic patterns defining landing runway location and orientation, comprising indicating elements defining respectively the movements of the aircraft about its three axes, means for actuating said indicating elements responsive to turn, direction, pitch and bank of the aircraft, electronic actuated horizontal and vertical indices, electronic means for cooperatively actuating said horizontal and vertical indices from space radiated signals, and means for superposing the turn, direction, pitch and bank indicating elements, and electronic vertical and horizontal indices in a superposed relation all in the same field of view of a pilot for giving a complete visual stimulus of the movements of the aircraft about its three axes and with respect to runway approach.

7. An aircraft instrument for indicating to the pilot a complete visual stimulus of the movements of the aircraft about its axes and the displacement of the aircraft from space radiated electronic patterns defining landing runway location and orientation, comprising indicating elements defining respectively the movements of the aircraft about its three axes, means for actuating said indicating elements responsive to turn, direction, pitch and bank of the aircraft and in degree, rate, direction and sensing corresponding to a pilot's view during clear weather flight, electronic actuated horizontal and vertical indices, electronic means for cooperatively actuating said horizontal and vertical indices from space radiated signals, and means for superposing the turn, direction, pitch and bank indicating elements, and electronic vertical and horizontal indices in the same field of view of a pilot for giving a complete visual stimulus of the movements of the aircraft about its three axes and with respect to runway approach.

References Cited in the file of this patent

UNITED STATES PATENTS

| Number | Name | Date |
|---|---|---|
| 1,760,163 | Morris | May 27, 1930 |
| 1,980,886 | Talafre et al. | Nov. 13, 1934 |
| 2,019,234 | Nistri | Oct. 29, 1935 |
| 2,137,194 | Weber | Nov. 15, 1938 |
| 2,178,637 | Link, Jr. | Nov. 7, 1939 |
| 2,283,190 | Crane | May 19, 1942 |
| 2,291,635 | Kenyon | Aug. 4, 1942 |
| 2,357,060 | Robinson | Aug. 29, 1944 |
| 2,458,022 | Phelps | Jan. 4, 1949 |
| 2,463,529 | Ferrill | Mar. 8, 1949 |
| 2,467,412 | Wathen | Apr. 19, 1949 |
| 2,531,492 | Angst et al. | Nov. 28, 1950 |
| 2,531,521 | Link | Nov. 28, 1950 |
| 2,537,996 | Hankes | Jan. 16, 1951 |
| 2,557,380 | Hickox | June 19, 1951 |